Patented Jan. 1, 1952

2,581,147

UNITED STATES PATENT OFFICE 2,581,147

LOW-TEMPERATURE ISO-OLEFIN POLYMERIZATION WITH ALUMINUM CHLORIDE CONTAINING ALUMINUM METAL

Henry G. Schutze, Baytown, Tex., assignor, by mesne assignments, to Standard Oil Development Company, Elizabeth, N. J., a corporation of Delaware No Drawing. Application March 23, 1950, Serial No. 151,517

12 Claims. (Cl. 252—429)

The present invention involves the production of vulcanizable polymers by reacting a tertiary mono-olefin and a diolefin at a temperature in the range from —50° to —175° F. in the presence of a catalytic solution formed from aluminum chloride containing a small amount of metallic aluminum and in the presence of a promoter for the reaction. The invention specifically contemplates dissolving aluminum chloride containing from 0.1 to 2% by weight of metallic aluminum in an inert solvent, such as methyl chloride. The catalytic solution formed thereby is chilled to a temperature in the range between —50° and —175° F. and is then added to a chilled mixture of tertiary mono-olefin and a diolefin having from 4 to 7 carbon atoms in the molecule at a temperature in the range between —50° and —175° F. in the presence of a promoter for the reaction. Under these conditions, a vulcanizable polymer is formed which may be subsequently recovered from the polymerized mixture.

The tertiary mono-olefin employed in the practice of the present invention is preferably isobutylene but may include other tertiary mono-olefins, such as 2-methyl-1-butene, 2-methyl-2-butene, 2-methyl-1-pentene, 2-methyl-2-pentene, 3-methyl-2-pentene and the tertiary mono-olefins having 7 carbon atoms in the molecule, such as isoheptalene.

The diolefins employed in the practice of the present invention will include the conjugated diolefins containing from 4 to 7 carbon atoms in the molecule and will include 1,3-butadiene, isoprene, the 1,3-pentadienes, the conjugated hexadienes and the conjugated heptadienes.

In practicing the present invention, the mono-olefins will be largely in excess of the diolefins. The mixture of tertiary mono-olefin and diolefin will usually be employed in admixture with a diluent for the reaction, such as methyl chloride or ethyl chloride and the like; methyl chloride will be preferred. The feed mixtures will usually include methyl chloride in an amount in the range from 70% to 80% by weight; the tertiary olefin will be present in an amount in the range between about 20% and 30% by weight and a diolefin in an amount in the range from 0.3 to 0.9% by weight of the said mixture; a mixture containing approximately 73% diluent, 26.5% tertiary mono-olefin and 0.5% diolefin gives very satisfactory results.

While methyl chloride and ethyl chloride have been mentioned as diluents for the reaction, it is understood that other diluents such as ethyl chloride, methyl bromide, carbon tetrachloride and the like may be used. These materials have been mentioned as diluents for the reaction. They also serve as solvents for the catalyst as will be described further in forming the catalytic solution.

The catalytic solution employed in the practice of the present invention may be formed by dissolving aluminum chloride containing from about 0.1 to about 2% by weight of metallic aluminum in methyl chloride or similar solvent as mentioned before. The solvent may contain a promoter for the reaction to promote the activity of the aluminum chloride catalyst or the promoter may be added to the reaction while it occurs. It is considered, however, that the solvent employed in forming the catalytic solution will contain a promoter for the reaction. In U. S. Patent 2,488,736, issued to Frederick A. Palmer on November 22, 1949, a method is described for forming a catalytic solution from water-containing alkyl halide solvents. It is contemplated that the catalyst solution employed in the practice of the present invention may be formed from the water-containing alkyl halide solvents such as described in the aforesaid Palmer Patent 2,488,736. The aluminum chloride containing the metallic aluminum in the amounts stated before may be dissolved in the water-containing alkyl halide solvents such as mentioned in the Palmer patent and then chilled to a low temperature in the range between —50° and —175° F. The metallic aluminum in the aluminum chloride appears to form a true solution since it has been observed that when the aluminum chloride containing metallic aluminum in the amounts stated is dissolved in the solvent there is no residue formed in the vessel in which the catalyst solution is prepared. It is possible that by virtue of the water dissolved in the alkyl halide solvents and by virtue of the presence of aluminum metal some chemical reaction may take place between the aluminum metal and the constituents of the catalytic solution. In any event, regardless of the type of solution that is formed, the solution does not deposit any residue and it may be considered that a true solution of aluminum chloride containing metallic aluminum is formed and may be employed in the practice of the present invention.

The aluminum chloride containing metallic aluminum employed in the practice of the present invention may be produced by bubbling chlorine gas into a pot of aluminum metal at a temperature of about 900° C. The aluminum chloride passes off in vapor form through a heated pipe into a condenser carrying entrained a small amount aluminum metal. The aluminum chloride crystallizes on the surface of the condenser and may be broken loose by a jarring action or the aluminum chloride may be condensed on the external surface of a rotating drum which is internally cooled by circulating water therethrough, the aluminum chloride being continuously scraped off by a suitable doctor knife. The aluminum chloride produced in this fashion is of grayish color and contains from 0.1 to 2% by weight of metallic aluminum, whereas the aluminum chloride which does not contain this amount of metallic aluminum has a yellowish cast due, it is believed, to the presence of chlorine.

In practicing the present invention, a chilled mixture of tertiary mono-olefin, diolefin and diluent for the reaction may be led into a suitable batch reactor and a catalytic solution formed by dissolving aluminum chloride containing metallic aluminum in the amount stated led into the reactor at a temperature in the range of between —50° and —175° F. The amount of aluminum chloride employed may range from 0.02% to 0.50% by weight based on the total hydrocarbon feed. The catalytic solution formed by dissolving aluminum chloride containing metallic aluminum in the amount stated will usually contain from 0.02 to 0.4 gram of aluminum chloride per 100 ml. of solution. Good results have been obtained with a catalytic solution containing 0.05 gram of aluminum chloride per 100 ml. of catalytic solution.

While the catalytic solution may contain a promoter for the reaction formed in situ by employing water-containing alkyl halide solvents as utilized in the reference to Palmer supra, the reaction may be promoted by adding to the reaction mixture during the reaction a suitable promoter, such as hydrogen chloride, small amounts of isobutylene and polymers thereof. It will be preferred, however, to use either a promoter formed in situ by employing water-containing alkyl halide solvents or by adding hydrogen chloride to the reaction mixture.

In order to illustrate the commercial utility of the present invention, a catalyst was formed by dissolving aluminum chloride containing metallic aluminum in the range given in methyl chloride to which water had been added; this catalytic solution was employed in a commercial plant producing over 100 tons of vulcanizable polymer per day. In this plant, isobutylene, isoprene and methyl chloride diluent were chilled to —145° F. in a reaction zone and to this chilled mixture was added a catalytic solution in accordance with the present invention. As a result of employing the catalytic solution in accordance with the present invention it was found that, during a month period of commercial operation, improved operations in the production of vulcanizable polymer were obtained. In a similar period of operation in which the prior art catalytic solutions were employed produced from aluminum chloride free of metallic aluminum the reaction was frequently upset and the polymer product varied widely. For example, with the prior art catalytic solutions frequency of such upsets averaged about two per week, whereas when the catalytic solution of the present invention was employed the upset operations occurred only once during a month period of observation. It will be apparent, therefore, that in any plant producing over 100 tons per day of vulcanizable polymer from butylene and isoprene upset operations for even a short period of time will substantially reduce the amount of production. Not only will the amount of product be reduced but the quality of the product will be seriously impaired.

It is not understood just what function the presence of the metallic aluminum in the catalytic solution performs but as a postulate the theory is advanced that the metallic aluminum in some unexplainable fashion reacts with materials which may subsequently accelerate the polymerization reaction to an uncontrollable extent. By virtue of the presence of a metallic aluminum, it is believed that these accelerating materials are inhibited or reacted with or possibly converted to an innocuous form which allows the polymerization to be carefully controlled. It is to be understood that this explanation is offered by way of a better understanding of the invention and is not to be construed to limit the invention to this particular postulate.

It is to be further understood that the invention is specifically directed to the low temperature polymerization reaction of tertiary mono-olefin and diolefin in the presence of a catalytic solution formed from aluminum chloride containing metallic aluminum in the amount stated and in the presence of a promoter for the reaction.

The nature and objects of the present invention having been completely described and illustrated, what I desire to claim as new and useful and to secure by Letters Patent is:

1. A process for producing vulcanizable polymers which comprises reacting a tertiary mono-olefin and a diolefin having from 4 to 7 carbon atoms in the molecule at a temperature in the range from —50° to —175° F. in the presence of a catalytic alkyl halide solution of aluminum chloride containing an amount not greater than 2% by weight of metallic aluminum and a promoter for the reaction.

2. A process in accordance with claim 1 in which the tertiary mono-olefin is isobutylene and the diolefin is isoprene.

3. A process in accordance with claim 1 in which the catalytic solution is formed by dissolving aluminum chloride containing metallic aluminum in methyl chloride.

4. A process for producing a vulcanizable polymer which comprises forming a mixture of a tertiary mono-olefin and a diolefin having from 4 to 7 carbon atoms in the molecule, chilling the mixture to a temperature in the range from —50° to —175° F., forming a promoted catalytic solution by dissolving aluminum chloride containing an amount not greater than 2% by weight of metallic aluminum in an inert alkyl halide solvent containing a promoter for said aluminum chloride, chilling the catalytic solution to a temperature in the range between —50° and —175° F., and polymerizing said mixture to form a vulcanizable polymer by adding said chilled catalytic solution thereto in an amount sufficient to cause polymerization thereof.

5. A process in accordance with claim 4 in which the tertiary mono-olefin is isobutylene and the diolefin is isoprene.

6. A process in accordance with claim 4 in which the catalytic solution is formed by dissolving aluminum chloride containing metallic aluminum in methyl chloride.

7. A process for producing a vulcanizable polymer which comprises forming a mixture of isobutylene and isoprene, chilling the mixture to a temperature in the range of —50° to —175° F., forming a promoted catalytic solution by dissolving aluminum chloride containing an amount not greater than 2% by weight of metallic aluminum in an inert alkyl halide solvent containing a promoter for said aluminum chloride, chilling the catalytic solution to a temperature in the range between —50° and —175° F., polymerizing said mixture to form a vulcanizable polymer by adding said chilled catalytic solution thereto in an amount sufficient to cause polymerization thereof, and recovering a vulcanizable polymer from said polymerized mixture.

8. A method in accordance with claim 7 in which the catalytic solution is formed by dissolving aluminum chloride containing metallic aluminum in methyl chloride containing water.

9. A process for producing a vulcanizable polymer which comprises forming a mixture of isobutylene, isoprene and methyl chloride, said mixture including an amount of isobutylene in the range of 20% and 30% by weight, isoprene in an amount in the range between 0.3% and 0.9% by weight and methyl chloride in an amount in the range between 70% and 80% by weight, chilling the mixture to a temperature in the range from —50° to —175° F. forming a catalytic solution by dissolving aluminum chloride containing from 0.1 to 2% by weight of metallic aluminum in methyl chloride containing water, chilling the catalytic solution to a temperature in the range between —50° and —175° F., polymerizing said mixture to form a vulcanizable polymer by adding said chilled catalytic solution thereto in an amount sufficient to cause polymerization thereof and recovering a vulcanizable polymer from said polymerized mixture.

10. A catalytic solution suitable for polymerizing a mixture of mono-olefins and diolefins at a low temperature which comprises a solution formed by dissolving aluminum chloride containing an amount not greater than 2% by weight of metallic aluminum in an inert alkyl halide solvent containing a promoter for said aluminum chloride.

11. A catalytic solution suitable for polymerizing a mixture of mono-olefins and diolefins at a low temperature which comprises a solution formed by dissolving aluminum chloride containing an amount not greater than 2% by weight of metallic aluminum in methyl chloride containing water.

12. A composition in accordance with claim 11 in which the aluminum chloride contains from 0.1% to 2% by weight of metallic aluminum.

HENRY G. SCHUTZE.

REFERENCES CITED

The following references are of record in the file of this patent:

UNITED STATES PATENTS

| Number | Name | Date |
|---|---|---|
| 2,057,306 | Martin | Oct. 13, 1936 |
| 2,180,345 | Blue | Nov. 21, 1939 |
| 2,471,890 | Palmer | May 31, 1949 |
| 2,488,736 | Palmer | Nov. 22, 1949 |

OTHER REFERENCES

Groggins "Unit Processes in Organic Synthesis," page 599, McGraw-Hill (1935).